United States Patent [19]

Suzuki

[11] Patent Number: 6,061,452
[45] Date of Patent: May 9, 2000

[54] SECURE MEDIA ON DEMAND SYSTEM WHEREBY CHARGE IS DETERMINED IN PART FROM THE PERIODICITY OF AN ENCRYPTION KEY

[75] Inventor: Shigeo Suzuki, Yokohama, Japan

[73] Assignee: Canon Kabushiki Kaisha, Tokyo, Japan

[21] Appl. No.: 08/978,072

[22] Filed: Nov. 25, 1997

[30] Foreign Application Priority Data

Nov. 29, 1996 [JP] Japan ................................ 8-319502

[51] Int. Cl.⁷ .................................................. H04L 9/00
[52] U.S. Cl. .................... 380/231; 380/233; 380/211; 348/5.5; 348/7; 348/10
[58] Field of Search ................... 348/10, 5.5, 7; 380/242, 231, 233, 211

[56] References Cited

U.S. PATENT DOCUMENTS

| | | | |
|---|---|---|---|
| Re. 33,189 | 3/1990 | Lee et al. ................................. | 380/20 |
| 4,937,866 | 6/1990 | Crowther et al. ........................ | 380/20 |
| 4,995,080 | 2/1991 | Bestler et al. ........................... | 380/21 |
| 5,029,207 | 7/1991 | Gammie .................................. | 380/10 |
| 5,345,505 | 9/1994 | Pires ....................................... | 380/20 |
| 5,815,194 | 9/1998 | Ueda ......................................... | 348/7 |
| 5,857,020 | 1/1999 | Peterson, Jr. ................................ | 380/4 |

Primary Examiner—Tod R. Swann
Assistant Examiner—Christopher M. Tucker
Attorney, Agent, or Firm—Morgan & Finnegan, L.L.P.

[57] ABSTRACT

An object of the invention is to provide a transmitting system of which data is difficult to be tapped and which is suitable for flexibly determining a watching and listening fee. In order to achieve the object, there is provided a combination of a transmitting method comprising steps of, transmitting encoded data which has been encoded, to a receiving side, changing the encoding in a predetermined unit, and performing recording according to requirement, from the receiving side of information concerning decoding of the encoded data, and a receiving method comprising steps of, receiving the encoded data which has been encoded, from a transmitting side, requiring the information concerning the decoding of the encoded data, to the transmitting side, and decoding the encoded data by using the obtained information concerning the decoding.

13 Claims, 4 Drawing Sheets

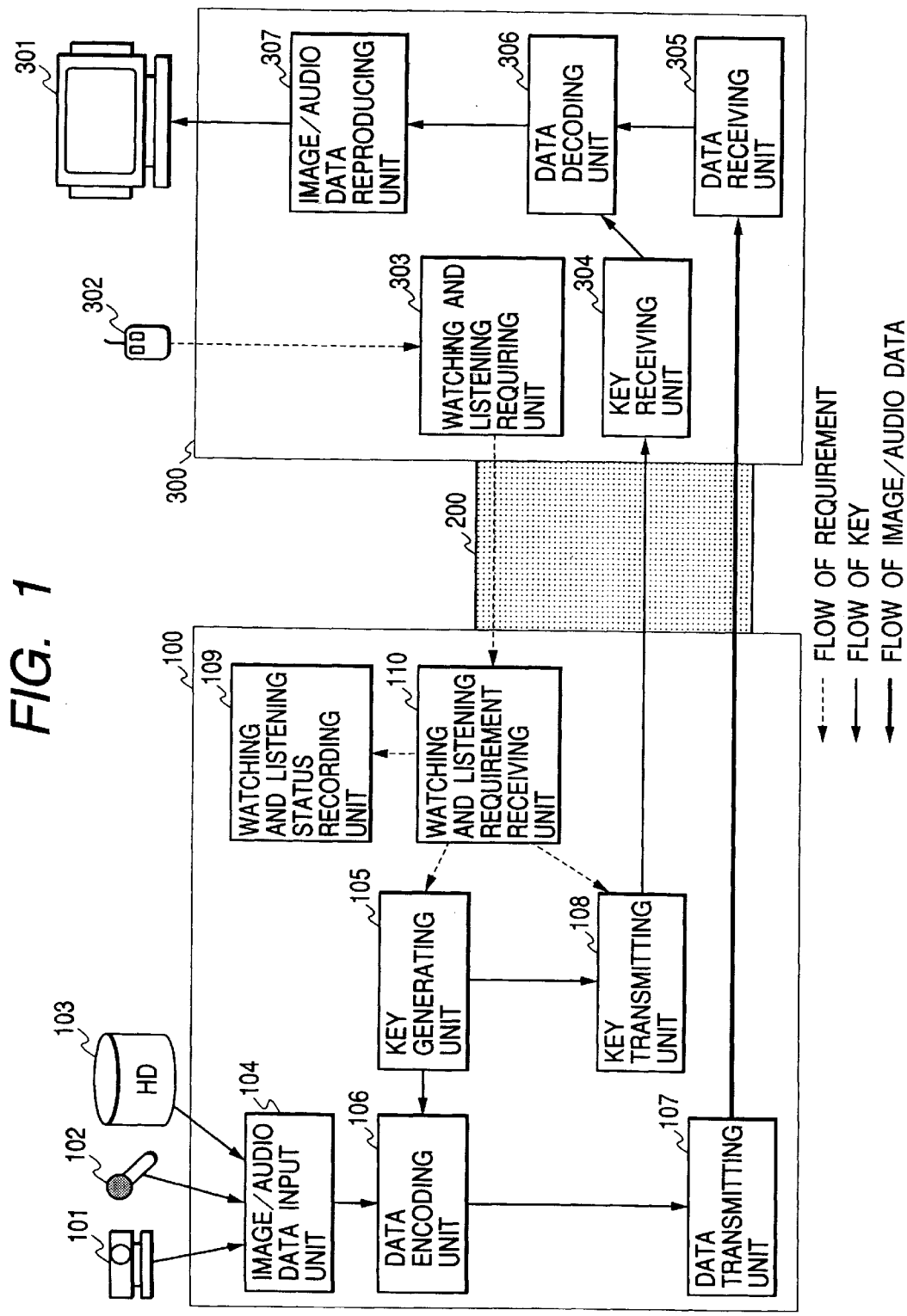

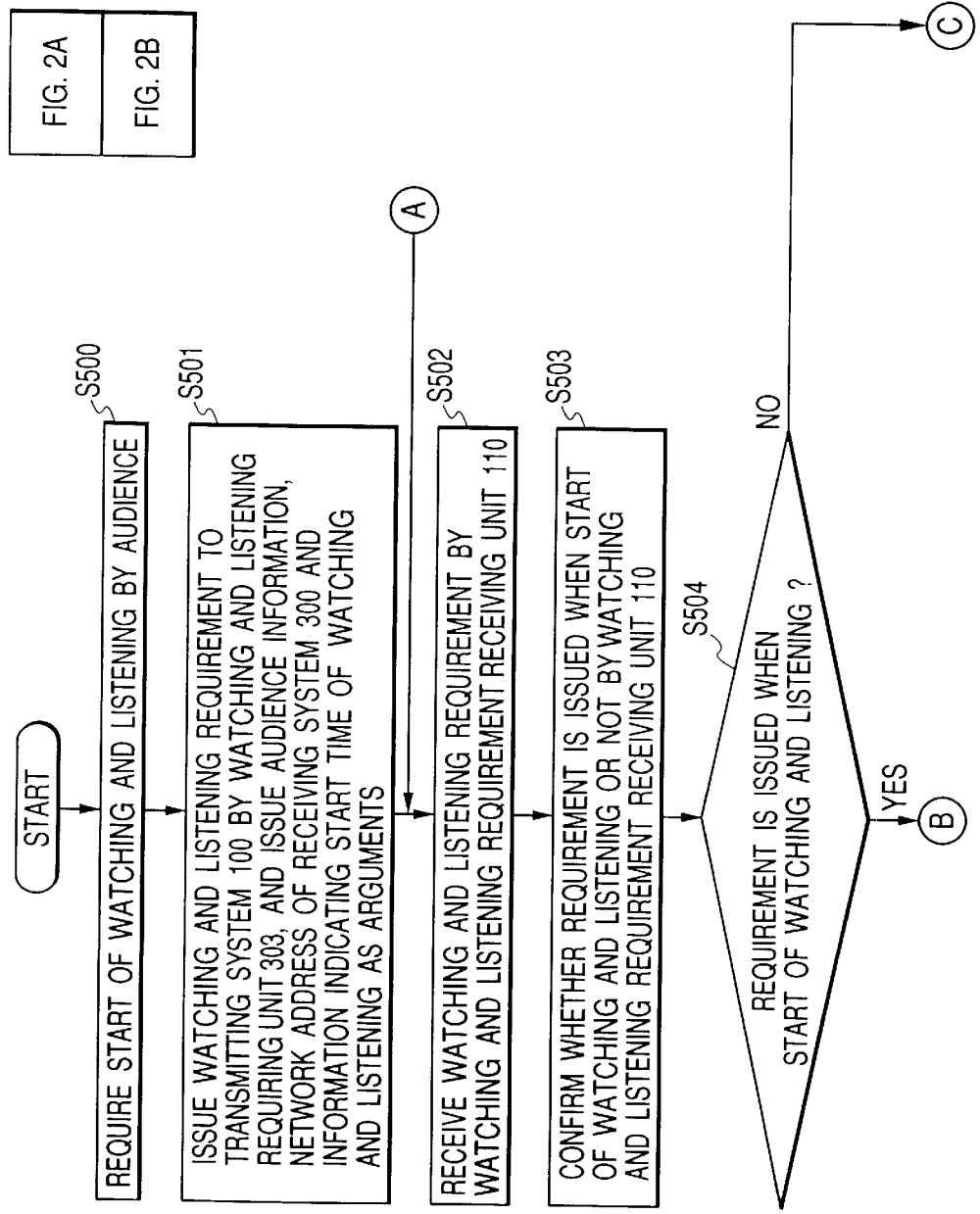

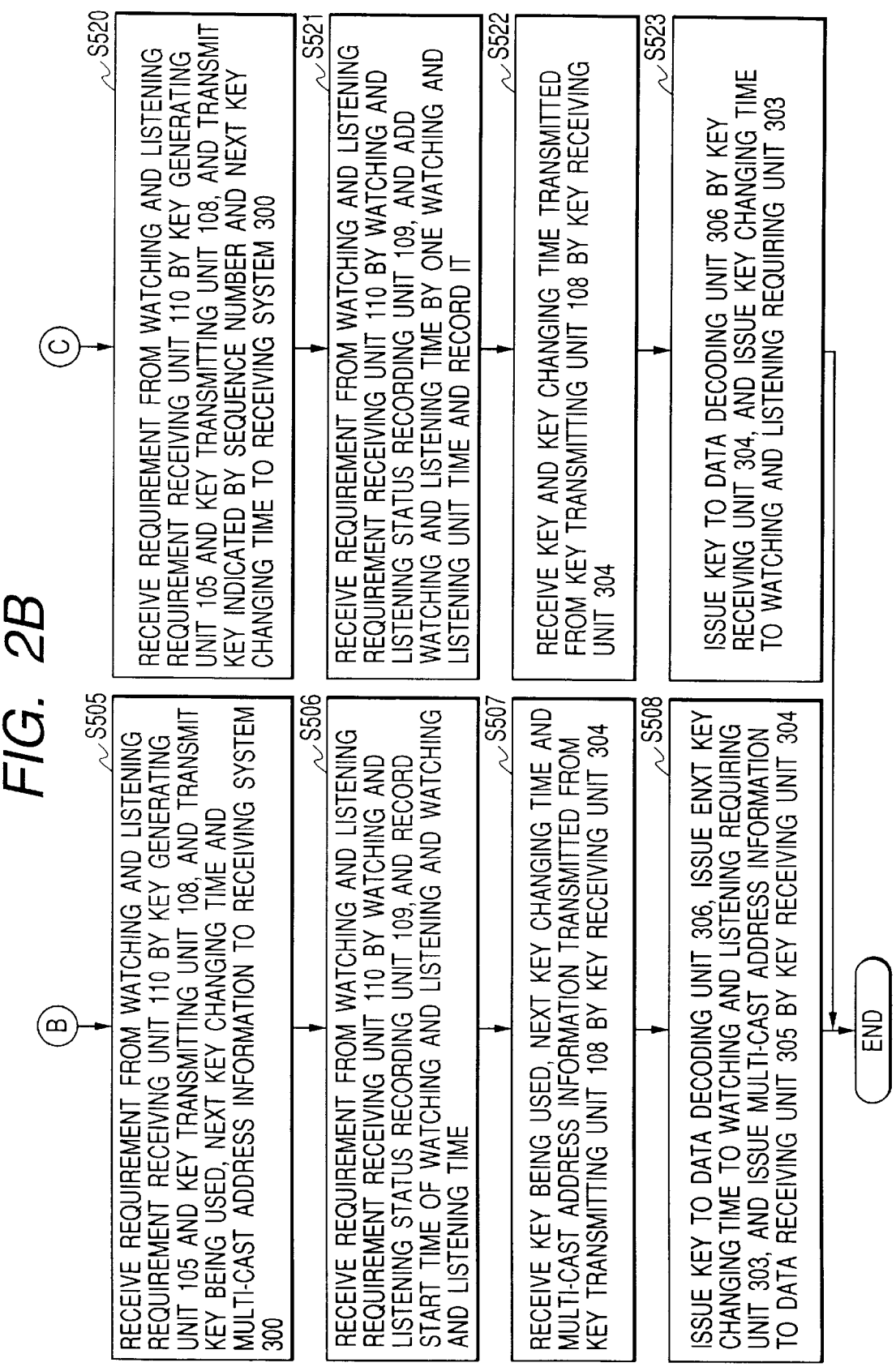

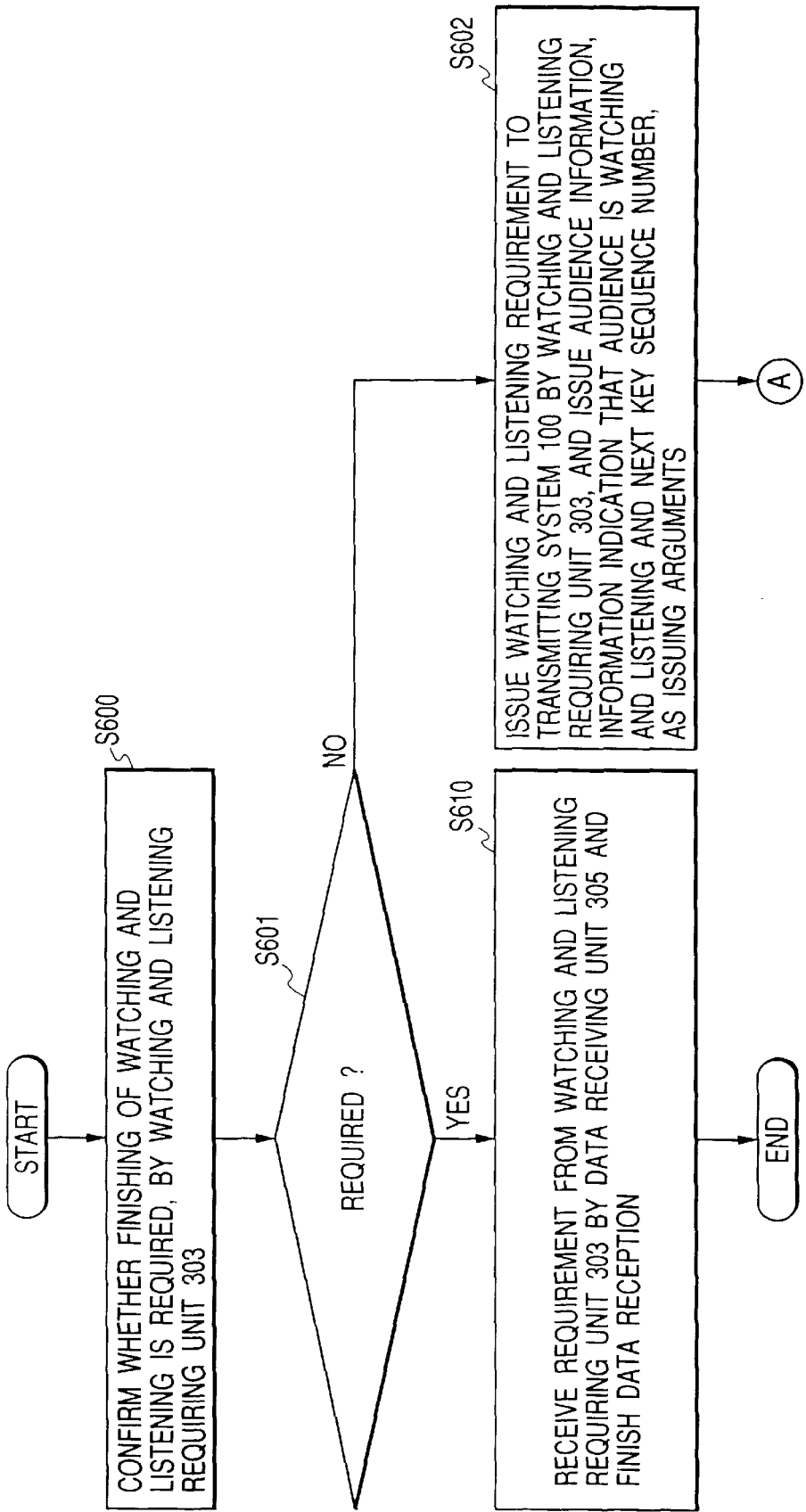

SECURE MEDIA ON DEMAND SYSTEM WHEREBY CHARGE IS DETERMINED IN PART FROM THE PERIODICITY OF AN ENCRYPTION KEY

BACKGROUND OF THE INVENTION

1. Field of the Invention

The present invention relates to a transmitting method, a receiving method, a transmitting apparatus, a receiving apparatus, a transmitting system and a medium.

2. Related Background Art

Conventionally, in a case where pay service is provided in such a system as image and audio data are simultaneously transmitted to a plurality of receivers by using digital transmitting media as described above, for example, it is a general method in which a service providing side provides only a watching and listening person (to be referred as audience hereinafter) who paid a fixed watching and listening fee, with information (network address and port number of transmitter, password using at connection, and the like) which allows the audience connecting to a transmitter. However, in such the method, since data to be transmitted is generally sent without any process or management such as encoding (or encryption), there is some fear that the audience who does not pay the watching and listening fee taps the transmitted data.

In order to eliminate such a problem, it can be supposed to apply a following method which is used in a pay television system or the like. That is, in this method, the service providing side encodes the data to be transmitted in a specific encoding (encryption) system, and then provides a decoding (decipher) means corresponding to this encoding system to the contracted audience. On the other hand, the contracted audience decodes the transmitted data by using the provided decoding means and watches and listens it (e.g., program), and pays a fixed fee in a predetermined method in such the unit as month, year or the like for a contract term. Further, a local fee management system such as, e.g., a video watching and listening fee management system in a hotel has been known.

However, in such the conventional system, the fixed fee is paid for one program, or the fixed fee is paid for the programs in the unit of month or year, whereby the watching and listening fee is fixedly determined irrespective of whether or not the audience actually watches and listens the programs. Therefore, the fee could not be flexibly managed.

SUMMARY OF THE INVENTION

The present invention has been made in consideration of the above-described problems, and an object thereof is to flexibly provide information.

An another object of the present invention is to provide a transmitting method, a receiving method, a transmitting apparatus, a receiving apparatus, a transmitting system and a medium of which data delivering efficiency is high or satisfactory and in which transmitting and/or receiving data are difficult to be tapped.

A further another object of the present invention to be able to flexibly determine and charge, although in a predetermined unit time, a watching and listening fee on the basis of an actual watching and listening time, and to provide a transmitting method, a receiving method, a transmitting apparatus, a receiving apparatus, a transmitting system and a medium in which the transmitting and/or receiving data are difficult to be tapped even in case of using a multicast system or a broadcast system of which delivering efficiency is high.

In order to solve the above-described problems, in the transmitting method according to one embodiment of the present invention, when data which was encoded is transmitted to a receiving side, such the data encoding (or encryption) is changed in a predetermined unit, and recording according to receiving side's requirement of information concerning decoding of the encoded data is performed.

Further, in the receiving method according to the embodiment of the present invention, the encoded data is received from a transmitting side, the information concerning the decoding of the encoded data is required to the transmitting side, and the encoded data is decoded by using the obtained information relating to the decoding.

A further another object of the present invention is to provide a software which is used to operate a system having such new functions, transmitting and receiving apparatuses which together construct such the system, and a computer which constructs such the system.

The above and other objects, features, and advantages of the present invention will be apparent from the following detailed description and the appended claims in conjunction with the accompanying drawings.

BRIEF DESCRIPTION OF THE DRAWINGS

FIG. 1 is a block diagram for explaining system structure of an image/audio transmitting system according to an embodiment of the present invention.

FIG. 2 which is composed of FIGS. 2A and 2B are flow charts showing a process in which a watching and listening person (to be referred as audience hereinafter) initially requires to start watching and listening, image and audio data are processed and finally reproduced respectively by a display and a speaker, in the image/audio transmitting system according to the embodiment of the present invention; and FIG. 3 is a flow chart showing a process in case of switching a key in the watching and listening by the audience, in the image/audio transmitting system according to the embodiment of the present invention.

DETAILED DESCRIPTION OF THE PREFERRED EMBODIMENTS

FIG. 1 is a block diagram for explaining system structure of an image/audio transmitting system according to an embodiment of the present invention. In FIG. 1, reference numeral 200 denotes digital transmitting media such as a LAN, an internet or an ISDN; reference numeral 100 denotes a transmitting system which transmits through the digital transmitting media 200 image and audio data photographed and taken, and image and audio data previously recorded in an HD (hard disk) or a CD-ROM; and 300 denotes a receiving system which receives the image and audio data transmitted through the digital transmitting media 200 and reproduces the received data by using a display and a speaker.

Reference numeral 101 denotes a camera apparatus which photographs or takes an image, digitizes the obtained image and outputs a digital image signal. Reference numeral 102 denotes a microphone which captures and digitizes an audio (or voice). A digitizing mechanism may be integrally provided in these apparatuses or may be independently provided in the form of separate board. Further, these apparatuses may include a data compressing mechanism. In case of including the compressing mechanism, an expanding mechanism corresponding thereto is provided in the receiving system 300. Reference numeral 103 denotes a memory apparatus e.g., a hard disk apparatus (HD) which previously stores the image and audio data. The memory apparatus 103 may be replaced by an apparatus such a CD-ROM. Further, the recorded or stored image and audio data may be compressed data. In case of the compressed data, an expansion mechanism corresponding thereto is provided in the receiving system 300.

Reference numeral 104 denotes an image audio data input unit which selects one, two or all of the camera apparatus 101, the microphone 102 and the HD 103, and inputs the image and audio data from the selected apparatus. It should be noted that such the selecting has been previously performed by a user of the transmitting system 100, i.e., a manager of image and audio transmitting services. Instead of adding the compressing mechanism to the camera apparatus 101 or the microphone 102, or instead of recording the compressed data in the HD 103, it may be applied structure in which the data compressing mechanism is included in the image/audio date input unit 104.

Reference numeral 105 denotes a key generating unit which continuously generates a key for encoding (or encryption) at a predetermined time interval, and reference numeral 106 denotes a data encoding unit which encodes the image and audio data inputted by said image/audio data input unit 104, by using the key generated by the key generating unit 105. In the present embodiment, it should be noted that a symmetrical key encoding system (DES (data encryption standard), RC or the like) is used as an encoding (or encryption) system of the image and audio data. When the symmetrical key encoding system is used, if the key which was used by the transmitting system 100 for the encoding is not taught by the transmitting system 100, the receiving system 300 can not perform the decoding. Therefore, the manager of the image and audio transmitting services can consider that only a watching and listening person (to be referred as audience hereinafter) to which the key was rendered is watching and listening the transmitted data (i.e., programs). How to render the key to the audience will be described later.

The time interval for generating the key becomes a unit time for watching and listening (to be referred as watching and listening unit time hereinafter). Therefore, as the watching and listening unit time, the user of the transmitting system 100, i.e., the manager of the image and audio transmitting services may determine an appropriate time (e.g., 30 minutes, 60 minutes or the like) suitable for image and audio sources.

Reference numeral 107 denotes a data transmitting unit which transmits the image and audio data encoded by the data encoding unit 106 to the receiving system 300 through digital transmitting media 200. In consideration of delivering efficiency, a multicast system such as an IP-multicast or the like or a broadcast system is used as a data transmitting system. If there is enough room in band widths of the digital transmitting media 200, the data may be independently transmitted to each receiving system in a unicast system.

Reference numeral 108 denotes a key transmitting unit which transmits or transfers the keys periodically generated by the key generating unit 105, to the receiving system 300 from which watching and listening requirement was issued. Such the keys may be transmitted in a channel same as that for the image and audio data, or in an another channel. Reference numeral 109 denotes a watching and listening status recording unit which records watching and listening status such as a watching and listening start time, a watching and listening time and the like, for each audience.

Reference numeral 110 denotes a watching and listening requirement receiving unit which requires, in accordance with watching and listening requirement from the receiving system 300, that the key generating unit 105 and the key transmitting unit 108 transmits the information concerning the generated key or the like to such the receiving system 300. Further, the watching and listening requirement receiving unit 110 requires that the watching and listening status recording unit 109 records the watching and listening start time and the watching and listening time.

Reference numeral 301 denotes a display/speaker which outputs the received information as a visible image and audible sound such that the audience (i.e., user) watches and listens the information. Reference numeral 302 denotes an inputting apparatus such as a mouse or the like which is used to input watching and listening start requirement and watching and listening termination requirement from the audience to the receiving system 300.

Reference numeral 303 denotes a watching and listening requiring unit which periodically issues the watching and listening requirement to the transmitting system 100 at the predetermined time interval in the watching and listening, on the basis of the watching and listening start or termination requirement from the inputting apparatus 302.

Reference numeral 304 denotes a key receiving unit which receives the key transmitted by the transmitting system 100 in response to the watching and listening requirement from the watching and listening requiring unit 303.

Reference numeral 305 denotes a data receiving unit which receives the encoded (encryption) image and audio data transmitted from the transmitting system 100, through the digital transmitting media 200. Reference numeral 306 denotes a data decoding unit which decodes the encoded image and audio data received by the data receiving unit 305, by using the key received by the key receiving unit 304. Reference numeral 307 denotes an image/audio data reproducing unit which reproduces the image and audio data decoded by the data decoding unit 306, on the display/speaker 301.

A sequence number is added to the periodically generated key by the key generating unit 105, and the added sequence number is incremented one by one every time the new key is generated. Then, when the data encoding unit 106 performs the encoding by using the key such the key sequence number representing which the key was used for the encoding is added to the encoded image and audio data in the form of a header. Therefore, in case of performing the decoding, the data decoding unit 306 checks the added sequence number and then performs the decoding by using the key corresponding to the checked number.

Each of the above-described units can be realized by the combination of each routine of softwares executed by a computer and each device operated based on each routine (e.g., hard disk for recording watching and listening status data in watching and listening status recording unit 109).

As previously described, in order to transmit the key, the key transmitting unit 108 may use the same channel as that for transmitting the image and audio data, or may use the another channel independently.

Further, as previously described, the watching and listening requirement may be transmitted in the channel same as that for the image and audio data, or in the another channel. Furthermore, a telephone line or the like may be used to transmit the requirement.

Subsequently, it will be explained hereinafter a flow beginning from the operation that the audience utilizing the receiving system 300 requires to start the watching and listening, and terminating with the operation that the image and audio data are reproduced by the display/speaker 301, with reference to a flow chart shown in FIGS. 2A and 2B.

It should be noted that, prior to issuance of the watching and listening requirement by the receiving system 300, following processes are performed in parallel in the transmitting system 100. That is, in the transmitting system 100, it should be noted that the image and audio data from the previously selected apparatus (i.e., camera apparatus 101, microphone 102 and HD 103) are inputted by the image/audio data input unit 104, and the inputted data is encoded with the data encoding unit 106 by using the key periodically generated by the key generating unit 105 and then transmitted by the data transmitting unit 107 in the multicast system. Therefore, it is structured that, when the receiving system 300 receives multicast address information from the transmitting system 100, the receiving system 300 starts receiving the encoded image and audio data transmitted in the multicast system.

In a step S500, the audience operates the inputting apparatus 302 to require the watching and listening start. Then, in a step S501, the watching and listening requiring unit 303 issues the watching and listening requirement to the transmitting system 100. At this time, audience information section, name, E-mail address and the like), a network address (host name, IP address or the like) and the information representing the watching and listening start requirement are added together and issued as arguments. The issuing is performed also in the communication through the digital transmitting media 200, and is generally performed by using a reliable protocol such as a TCP/IP or the like.

Subsequently, in a step S502, the watching and listening requirement receiving unit 110 in the transmitting system 100 receives the watching and listening requirement, and also accepts argument information. Then, in a step S503, the transmitting system 100 judges whether the requirement was issued at the watching and listening start time or in the actual watching and listening, by checking the argument information. In this case, since the requirement was issued at the watching and listening start time, a step S504 results in "YES" and the flow advances to a step S505.

In the step S505, the watching and listening requirement receiving unit 110 requires the key generating unit 105 and the key transmitting unit 108 to transmit the key which is being used, a next key changing time and multicast address information to the receiving system 300. Then, the key generating unit 105 and the key transmitting unit 108 which received such the requirement transmit the key being used, the next key changing time and the multicast address information to the receiving system 300. Such the transmitting is also performed by using the TCP/IP or the like, but may be performed by using an another method. In this case, in order to prevent tapping, it is necessary to encode the key by using a generally utilized non-symmetrical key encoding system such as an RSA (Ron Rivest, Adi Shamir, Leonard Adleman) system or the like. Further, for example, when the key being used is changed to the newly generated key 14 minutes after to perform the encoding, the next key changing time may be expressed as "14 minutes".

Subsequently, in a step S506, the watching and listening requirement receiving unit 110 requires the watching and listening status recording unit 109 to add the audience information as the arguments, such that the watching and listening start time and the watching and listening time of the audience who utilizes the receiving system 300 are recorded.

Then, the watching and listening status recording unit 109 which received such the requirement records the use start time of the key being used, as the audience's watching and listening start time rendered by the argument, and further records one watching and listening unit time as the watching and listening time. As described above, the watching and listening start time and the watching and listening time for each audience are recorded in the unit of watching and listening unit time.

Since the processes in these steps S505 and S506 are independently performed, these processes may be performed in parallel by utilizing a multi-task (or multi-threading) mechanism or the like of an OS (operating system).

Subsequently, in a step S507, the receiving system 300 receives the key being used, the next key changing time and the multicast address information transmitted from the transmitting system 100, by using the key receiving unit 304. In a step S508, the key receiving unit 304 renders the key to the data decoding unit 306, the next key changing time to the watching and listening requiring unit 303, and the multicast address information to the data receiving unit 305, respectively.

The data receiving unit 305 to which the multicast address information was rendered starts receiving the encoded image and audio data from the transmitting system 100, by setting a multicast address, and repeats the receiving process every time the data is received until the watching and listening termination requirement from the audience is inputted. The encoded image and audio data which were received are sequentially transferred to the data decoding unit 306. Then, the data decoding unit 306 performs the decoding process on the encoded image and audio data by using the key rendered in the step S508. In this case, the unit 306 performs the decoding process by using the key coincident with the sequence number added to the encoded image and audio data, and then sequentially transfers the decoded image and audio data to the image/audio data reproducing unit 307. The image/audio data reproducing unit 307 sequentially reproduces the image and audio data by using the display/speaker 301.

On the other hand, the watching and listening requiring unit 303 to which the next key changing time was rendered calculates an issuance time of the next watching and listening requirement on the basis of the rendered information. Then, the watching and listening requiring unit 303 is set such that the unit 303 is automatically re-initiated at the calculated next watching and listening requirement issuance time, and then the process is once interrupted. It should be noted that the next watching and listening requirement issuance time is set slightly before the next key changing time (i.e., about one to two minutes before). In this case, it is necessary to set the next watching and listening requirement issuance time at least before the watching and listening requiring unit 303 issues the requirement, the key receiving unit 304 receives the key and renders it to the data decoding unit 306, and then decoding preparation is completed.

Since a series of processes by the data receiving unit 305, the data decoding unit 306 and the image/audio data reproducing unit 307 and the process by the watching and listening requiring unit 303 can be independently performed in parallel, it is desirable that these processes are realized or performed by utilizing the multi-task (or multi-threading) mechanism or the like of the OS.

Subsequently, a flow in the process when the key is changed or switched in the watching and listening will be explained with reference to the flow charts shown in FIGS.

2A, 2B and 3. When the watching and listening requiring unit 303 is automatically re-initiated at the next watching and listening requirement issuance time by a timer mechanism or the like of the OS, it is checked in a step S600 of FIG. 3 whether or not there is an input representing watching and listening termination (or finish) from the inputting apparatus 302. In order to do so, an end flag (its initial value "OFF") is prepared in the watching and listening requiring unit 303. Then, if there is the input representing the watching and listening termination from the inputting apparatus 302, the end flag is set as "ON". Thus, if the end flag is checked in the step S600, it becomes possible to check whether or not there is the input representing the termination.

When there is the input representing the termination, it is judged that the audience wishes to terminate the watching and listening, whereby the flow advances to a step S601 and then to a step S610. In the step S610, the watching and listening requiring unit 303 requires the data receiving unit 305 to terminate the data receiving, and then the data receiving unit 305 which accepted such the requirement terminates the receiving process.

On the other hand, when there is no input representing the termination, it is judged that the audience wishes to continue the watching and listening, whereby the flow advances to the step S601 and then to a step S602. In the step S602, the watching and listening requiring unit 303 issues or transmits the watching and listening requirement to the transmitting system 100. At this time, as the arguments, the audience information (section, name or E-mail address, i.e., information capable of identifying user), the information representing that the requirement was issued in the watching and listening, and the next-key sequence number (i.e., current-key sequence number +1) are added together and issued. Then, the flow advances to the step S502 in FIGS. 2A and 2B.

In the step S502, the watching and listening requirement receiving unit 110 in the transmitting system 100 receives the watching and listening requirement and also accepts the argument information. Then, in the step S503, it is judged by checking the argument information whether the requirement was issued at the watching and listening start time or in the actual watching and listening. In this case, since the requirement was issued in the actual watching and listening, the step S504 results in "NO" and the flow advances to a step S520. In the step S520, the watching and listening requirement receiving unit 110 requires the key generating unit 105 and the key transmitting unit 108 to transmit the key and the next key changing time indicated by the sequence numbers of the arguments to the receiving system 300. Then, the key generating unit 105 and the key transmitting unit 108 which received the requirement transmit the key and the next key changing time indicated by the sequence numbers of the arguments of the receiving system 300. In order to do so, it is necessary for the key generating unit 105 to prepare the new key before the key for the data encoding is actually changed (i.e., until watching and listening requirement is received from receiving system). Further, in order to prepare for the requirement issued at the watching and listening start time, until the encoding by the generated key itself terminates, it is necessary for the key generating unit 105 to hold such the key.

Then, in a step S521, the watching and listening requirement receiving unit 110 requires the watching and listening status recording unit 109 to add the audience information as the arguments, such that the audience utilizing the receiving system 300 records that the watching and listening is performed in the next watching and listening unit time. The watching and listening status recording unit 109 which received the requirement adds and records the audience's watching and listening time received as the argument, by one watching and listening unit time.

Since these steps S520 and S521 are independently performed, these processes may be performed in parallel by utilizing the multi-task (or multi-threading) mechanism or the like of the OS.

Subsequently, in a step S522, the receiving system 300 receives the key and the next key changing time transmitted from the transmitting system 100, by using the key receiving unit 304. In a step S523, the key receiving unit 304 renders the key to the data decoding unit 306 and the next key changing time to the watching and listening requiring unit 303, respectively. The following processes are substantially the same as those in the above-described processed at the watching and listening start time.

As explained above, according to the present embodiment, although in the predetermined unit time, a watching and listening fee can be flexibly determined and charged on the basis of the actual watching and listening time. Also, the transmitting and/or receiving data can be made difficult to be tapped even in case of using the multicast system or the broadcast system both of which delivering efficiency is high.

Further, as apparent from the above-described explanation, according to the present embodiment, the above-described processes can be performed without providing any specific hardware.

Furthermore, the object of the present invention can be achieved by supplying a storing medium which stores program codes of a software to realize the above-described embodiment to the system or the apparatus, and then by reading and executing the program codes stored in the storing medium with a computer (CPU or MPU) in the above system or the apparatus.

In this case, the program codes themselves read from the storing medium realize the functions of the above-described embodiment. Thus, the storing medium which stores such the program codes is included in the present invention.

As such the storage medium for storing the program codes, e.g., a floppy disk, a hard disk, an optical disk, a magneto-optical disk, a CD-ROM, a CD-R, a magnetic tape, a nonvolatile memory card, a ROM or the like can be used.

Further, needless to say, it is included in the scope of the present invention a case where the program codes read from the storing medium are stored or written into a memory provided for a function expansion board inserted in the computer or a function expansion unit connected to the computer and, after that, a CPU or the like provided for the function expansion board or the function expansion unit executes a part or all of the actual processes on the basis of instructions of the program codes, and the functions of the above-described embodiment are realized by such the processes.

As explained above, according to the present embodiment, it can be provided the transmitting method and the receiving method which are suitable for the case where the watching and listening fee is flexibly determined and charged on the basis of the predetermined actual watching and listening time. Further, it can be derived the specific effect that the transmitting and/or receiving data can be made difficult to be tapped even in case of using the multicast system or the broadcast system of which delivering efficiency is high.

The present invention can be variously modified and varied within the spirit and scope of the appended claims.

What is claimed is:

1. A transmitting system comprising:
 a transmitting system includes,
  image/audio data input means for inputting image and audio data,
  key generating means for generating a key for new encoding at a predetermined time interval, by using a key encoding system,
  data encoding means for encoding the image and audio data inputted by said image/audio data input means, in the encoding system by using the key generated by said key generating means,
  data transmitting means for transmitting the image and audio data encoded by said data encoding means, to a receiving system through digital transmitting media,
  key transmitting means for transmitting information according to the key generated by said key generating means, to the receiving system from which watching and listening requirement was issued, and
  recording means for recording information according to the watching and listening requirement, for each watching and listening person; and
 said receiving system includes,
  watching and listening requiring means for issuing the watching and listening requirement to said transmitting system at predetermined time interval, in accordance with requirement from the watching and listening person,
  receiving means for receiving information according to the key transmitted by said transmitting system in response to the watching and listening requirement by said watching and listening requiring means, and
  data decoding means for receiving the encoded image and audio data transmitted from said transmitting system through the digital transmitting media, decoding the received data by using the information received by said receiving means, and outputting the decoded data,
  wherein said watching and listening requiring means continuously issues the watching and listening requirement to said transmitting system every predetermined unit time while the watching and listening person wishes the watching and listening, and stops issuing the watching and listening requirement when the watching and listening person terminates the watching and listening.

2. A system according to claim 1, wherein said data transmitting means transmits the image and audio data after encoding them by using a symmetrical key encoding system.

3. A system according to claim 1, wherein said key transmitting means stops transmitting the key when there is no watching and listening requirement from said receiving system.

4. A system according to claim 1, wherein said transmitting system is capable of charging by recording from what time and how many the keys changed every predetermined unit time were transmitted.

5. A transmitting apparatus comprising:
 transmitting means for transmitting encoded data which has been encoded, to a receiving side;
 changing means for changing the encoding in a predetermined unit; and
 recording means for performing recording according to requirement, from the receiving side, of information concerning decoding of the encoded data,
 wherein said transmitting apparatus is capable of charging by recording from what time and how many keys changed every predetermined unit time were transmitted.

6. An apparatus according to claim 5, wherein said transmitting means transmits image and audio data after encoding them by using a symmetrical key encoding system.

7. An apparatus according to claim 5, wherein said transmitting means stops transmitting when there is no watching and listening requirement from the receiving side.

8. A storing medium for storing, in a computer readable state, the steps of:
 changing, in case of transmitting encoded data which has been encoded to a receiving side, an encoding key in a predetermined unit; and
 performing recording according to requirement, from the receiving side, of information concerning decoding of the encoded data,
 wherein a transmitting side is capable of charging by recording from what time and how many keys changed every predetermined time were transmitted.

9. A medium according to claim 8, wherein transmitting side transmits image and audio data after encoding them by using a symmetrical key encoding system.

10. A medium according to claim 8, wherein the transmitting side stops transmitting when there is no watching and listening requirement from the receiving side.

11. A storing medium for storing, in a computer readable state, the steps of:
 receiving encoded data which has been encoded, from a transmitting side;
 requiring information concerning decoding of the encoded data to the transmitting side; and
 decoding the encoded data by using the obtained information concerning the decoding,
 wherein said requiring step continuously issues watching and listening requirement to the transmitting side every predetermined unit time while a watching and listening person wishes watching and listening, and stops issuing the watching and listening requirement when the watching and listening person terminates the watching and listening.

12. A transmitting system comprising:
 a transmitting system includes,
  image/audio data input means for inputting image and audio data,
  key generating means for generating a key for new encoding at a predetermined time interval, by using a key encoding system,
  data encoding means for encoding the image and audio data inputted by said image/audio data input means, in the encoding system by using the key generated by said key generating means,
  data transmitting means for transmitting the image and audio data encoded by said data encoding means, to a receiving system through digital transmitting media,
  key transmitting means for transmitting information according to the key generated by said key generating means, to the receiving system from which watching and listening requirement was issued, and
  recording means for recording information according to the watching and listening requirement, for each watching and listening person; and
 said receiving system includes,
  watching and listening requiring means for issuing the watching and listening requirement to said transmitting system at predetermined time interval, in accordance with requirement from the watching and listening person, receiving means for receiving information according to the key transmitted by said transmitting system in response to the watching and listening requirement by said watching and listening requiring means, and data decoding means for receiving the encoded image and audio data transmitted from said transmitting system through the digital transmitting media, decoding the received data by using the information received by said receiving means, and outputting the decoded data, wherein said transmitting system is capable of charging by recording from what time and how many the keys changed every predetermined unit time were transmitted.

13. A receiving apparatus comprising:

receiving means for receiving encoded data which has been encoded, from a transmission side;

requiring means for requiring information concerning decoding of the encoded data, to the transmitting side; and decoding means for decoding the encoded data by using the obtained information concerning the decoding, wherein said requiring means continuously issues watching and listening requirement to the transmitting side every predetermined unit time while a watching and listening person wishes watching and listening, and stops issuing the watching and listening requirement when the watching and listening person terminates the watching and listening.

* * * * *

UNITED STATES PATENT AND TRADEMARK OFFICE
CERTIFICATE OF CORRECTION

PATENT NO. : 6,061,452
DATED : May 9, 2000
INVENTOR(S) : Shigeo Suzuki

It is certified that error appears in the above-identified patent and that said Letters Patent is hereby corrected as shown below:

Title page,
Item [54], lines 1-4, delete "SECURE MEDIA ON DEMAND SYSTEM WHEREBY CHARGE IS DETERMINED IN PART FROM THE PERIODICITY OF AN ENCRYPTION KEY" and insert therefor -- A SECURE MEDIA ON DEMAND SYSTEM WHEREBY CHARGE IS DETERMINED IN PART FROM THE PERIODICITY OF AN ENCRYPTION KEY --
Item [75], delete "Yokohama" following Shigeo Suzuki and insert therefor
-- Kanagawa-ken --.

Column 5,
Line 38, "100 Judges" should read -- 100 judges --.

Column 7,
Line 45, "In the step S520," should begin as a new paragraph.

Signed and Sealed this

Twenty-fifth Day of December, 2001

Attest:

*Attesting Officer*

JAMES E. ROGAN
*Director of the United States Patent and Trademark Office*